(12) United States Patent
Krishnan et al.

(10) Patent No.: US 11,636,330 B2
(45) Date of Patent: Apr. 25, 2023

(54) SYSTEMS AND METHODS FOR CLASSIFICATION USING STRUCTURED AND UNSTRUCTURED ATTRIBUTES

(71) Applicant: Walmart Apollo, LLC, Bentonville, AR (US)

(72) Inventors: Abhinandan Krishnan, Sunnyvale, CA (US); Abilash Amarthaluri, San Jose, CA (US); Venkatesh Kandaswamy, San Ramon, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 638 days.

(21) Appl. No.: 16/262,620

(22) Filed: Jan. 30, 2019

(65) Prior Publication Data

US 2020/0242465 A1 Jul. 30, 2020

(51) Int. Cl.
*G06N 3/08* (2006.01)
*G06N 20/00* (2019.01)

(52) U.S. Cl.
CPC ............... *G06N 3/08* (2013.01); *G06N 20/00* (2019.01)

(58) Field of Classification Search
CPC ................................. G06N 3/08; G06N 20/00
USPC .......................................................... 706/20
See application file for complete search history.

(56) References Cited

U.S. PATENT DOCUMENTS

| | | | | |
|---|---|---|---|---|
| 10,304,188 B1* | 5/2019 | Kumar | ................. | G06V 20/695 |
| 2005/0261938 A1* | 11/2005 | Silverbrook | ......... | G06Q 10/087 |
| | | | | 705/2 |
| 2014/0214841 A1 | 7/2014 | Garera et al. | | |
| 2014/0214845 A1 | 7/2014 | Garera et al. | | |
| 2015/0379430 A1* | 12/2015 | Dirac | ..................... | G06N 20/00 |
| | | | | 706/12 |
| 2017/0046613 A1* | 2/2017 | Paluri | .................. | G06N 3/0454 |
| 2017/0286805 A1* | 10/2017 | Yu | .......................... | G06F 16/337 |
| 2017/0308790 A1 | 10/2017 | Nogueira Dos Santos et al. | | |
| 2018/0096219 A1 | 4/2018 | Socher | | |
| 2018/0121533 A1 | 5/2018 | Magnani et al. | | |

(Continued)

OTHER PUBLICATIONS

Retweet Wars: Tweet Popularity Prediction via Dynamic Multimodal Regression (Year: 2018).*

(Continued)

*Primary Examiner* — George Giroux
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving attribute data comprising a set of unstructured attribute data and a set of structured attribute data, analyzing the set of unstructured attribute data by processing through a first set of one or more Long Short Term Memory (LSTM) layers, to obtain an unstructured semantic signature, analyzing the set of the structured attribute data by processing through a first set of one or more Convolutional Neural Network (CNN) layers, to obtain a structured semantic signature, analyzing the unstructured semantic signature and the structured semantic signature, and classifying the item in one or more item categories. Other embodiments are disclosed herein.

20 Claims, 11 Drawing Sheets

(56) References Cited

U.S. PATENT DOCUMENTS

| | | | |
|---|---|---|---|
| 2018/0173495 A1* | 6/2018 | Podder | G06F 11/3672 |
| 2018/0218429 A1 | 8/2018 | Guo et al. | |
| 2018/0225553 A1 | 8/2018 | Ha et al. | |
| 2018/0268298 A1 | 9/2018 | Johansen et al. | |
| 2019/0065589 A1* | 2/2019 | Wen | G06F 16/951 |
| 2019/0205939 A1* | 7/2019 | Lal | G06N 3/0454 |
| 2019/0340503 A1* | 11/2019 | Cheng | G06F 16/3332 |
| 2020/0193511 A1* | 6/2020 | Saito | G06N 3/08 |

OTHER PUBLICATIONS

Lin et al. (Early Diagnosis and Prediction of Sepsis Shock by Combining Static and Dynamic Information using Convolutional-LSTM, Jul. 2018, pp. 219-228) (Year: 2018).*
Wang et al. (Dimensional Sentiment Analysis Using a Regional CNN-LSTM Model, Aug. 2016, pp. 225-230) (Year: 2016).*
Kim, Yoon; "Convolutional Neural Networks for Sentence Classification," (arXiv: 1408.5882v2 [cs.CL], 6 pgs Sep. 3, 2014.
Ha, Jung-Woo, et al. "Large-Scale Item Categorization in e-Commerce Using Multiple Recurrent Neural Networks," SIGKDD Interdisciplinary Conference, Aug. 2016, 9 pgs. Aug. 2016.

* cited by examiner

400

401 — Receiving attribute data comprising text associated with an item, the attribute data comprising (i) a set of unstructured attribute data for the item, and (ii) a set of structured attribute data for the item

402 — Analyzing the set of unstructured attribute data by processing through a first set of one or more Long Short Term Memory (LSTM) layers, to obtain an unstructured semantic signature indicative of a probability that the item belongs to one or more item categories based on the set of unstructured attribute data

403 — Analyzing the set of the structured text attributes by processing through a first set of one or more Convolutional Neural Network (CNN) layers, to obtain a structured semantic signature that is indicative of the likelihood that the item belongs to one or more item categories based on the set of structured attribute data

404 — Analyzing the unstructured semantic signature and structured semantic signatures by processing through one or more layers selected from a second set of CNN layers and a first set of bidirectional LSTM layers, to obtain an item semantic signature that is indicative of the likelihood that the item belongs to one or more item categories based on both the unstructured and structured attribute data sets

405 — Classifying the item in one or more item categories in relation to the item semantic signature

| 501 — Dividing the set of unstructured attribute data into two or more subsets based on unstructured attribute data type |

| 502 — Processing at least two of the two or more subsets, separately from each other, through one or more LSTM layers in the first set of LSTM layers, to obtain at least two unstructured data subset semantic signatures |

| 503 — Processing the at least two unstructured data subset semantic signatures through one or more LSTM layers of the first set of LSTM layers, to obtain the unstructured semantic signature based on the set of unstructured attribute data |

601 – Generating a structured attribute data name string by concatenating the one or more structured attribute data names

602 – Generating a structured attribute data value string by concatenating the one or more structured attribute data values

603 – Processing the structured attribute data name string through one or more CNN layers of the first set of CNN layers

604 – Processing the structured attribute data value string through one or more CNN layers of the first set of CNN layers, based on a result obtained from processing the structured attribute data name string through one or more CNN layers of the first set of CNN layers

FIG. 6

Top N Accuracy

FIG. 9

SYSTEMS AND METHODS FOR CLASSIFICATION USING STRUCTURED AND UNSTRUCTURED ATTRIBUTES

TECHNICAL FIELD

This disclosure relates generally to systems and methods for classification of items in one or more categories using structured and unstructured data

BACKGROUND

Item classification can present a challenging problem, particularly when attempting to classify an item within a potential number of categories that is fairly large. Data size, category skewness, and noisy metadata are examples of issues that can present hurdles to precise item classification. Nonetheless, the ability to accurately and efficiently classify items in different categories can be important in a variety of different disciplines, including in e-commerce applications. Accordingly, there is a need for classification systems and methods for the classification of items into appropriate categories based on attributes and/or data associated with the items.

BRIEF DESCRIPTION OF THE DRAWINGS

To facilitate further description of the embodiments, the following drawings are provided in which:

FIG. 4 is a flowchart for a method, according to certain embodiments;

FIG. 5 is a flowchart for a portion of the method illustrated in FIG. 4, according to certain embodiments;

FIG. 6 is a flowchart for a portion of the method illustrated in FIG. 4, according to certain embodiments;

FIG. 9 illustrates a chart showing the top N accuracy according to an item classification embodiment.

Figure 1:
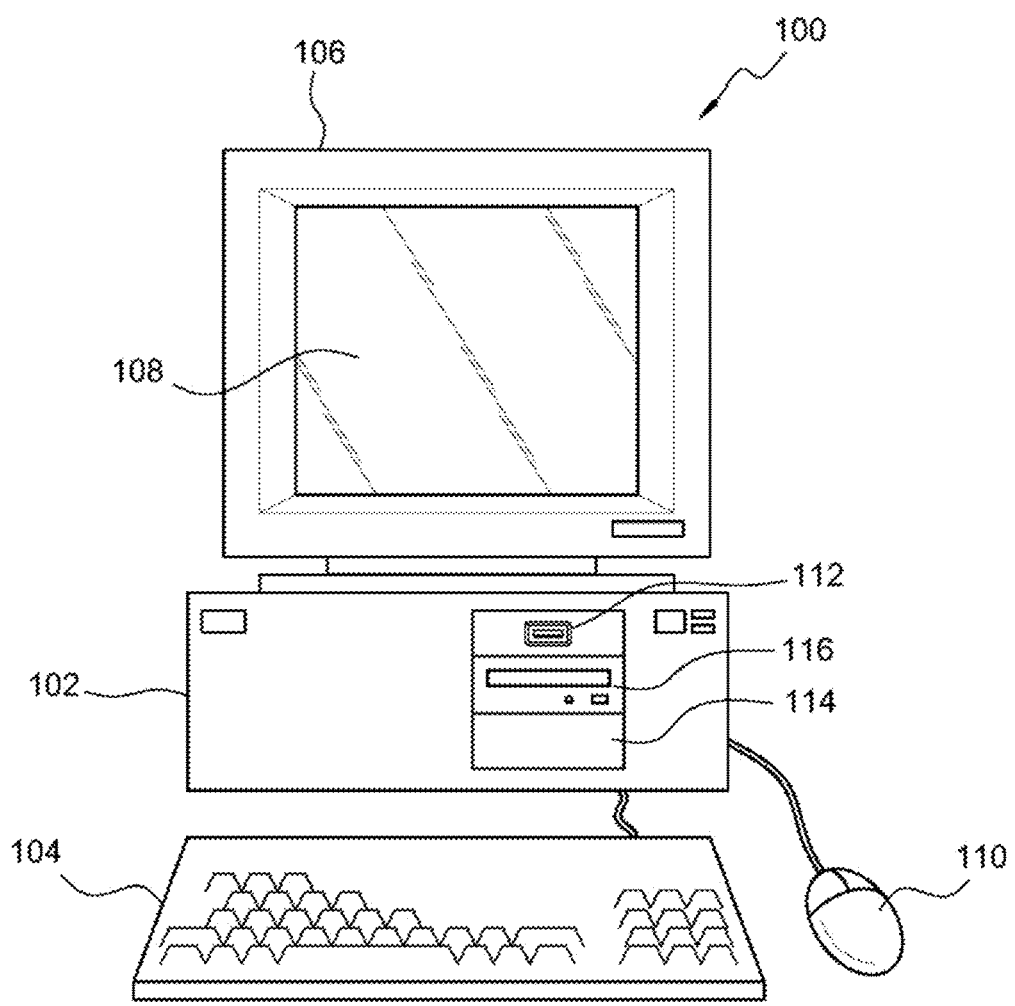
FIG. 1 illustrates a front elevational view of a computer system that is suitable for implementing various embodiments of the systems disclosed in FIGS. 3 and 7.

For simplicity and clarity of illustration, the drawing figures illustrate the general manner of construction, and descriptions and details of well-known features and techniques can be omitted to avoid unnecessarily obscuring the present disclosure. Additionally, elements in the drawing figures are not necessarily drawn to scale. For example, the dimensions of some of the elements in the figures can be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors, and one or more non-transitory computer-readable storage media storing computing instructions configured to run on the one or more processors. The one or more non-transitory computer-readable storage media storing computing instructions can be configured to run on the one or more processors and perform acts of receiving attribute data comprising text associated with an item, the attribute data comprising (i) a set of unstructured attribute data for the item, and (ii) a set of structured attribute data for the item, analyzing the set of unstructured attribute data by processing through a first set of one or more Long Short Term Memory (LSTM) layers, to obtain an unstructured semantic signature indicative of a probability that the item belongs to one or more item categories based on the set of unstructured attribute data, analyzing the set of structured attribute data by processing through a first set of one or more Convolutional Neural Network (CNN) layers, to obtain a structured semantic signature that is indicative of the likelihood that the item belongs to one or more item categories based on the set of structured attribute data, analyzing the unstructured semantic signature and the structured semantic signature by processing through one or more layers selected from a second set of one or more CNN layers and a first set of bidirectional LSTM layers, to obtain an item semantic signature that is indicative of the likelihood that the item belongs to one or more item categories based on both the set of unstructured attribute data and the set of structured attribute data, and classifying the item in one or more item categories in relation to the item semantic signature.

Various embodiments include a method. The method can be implemented via execution of computing instructions configured to run at one or more processors and configured to be stored at non-transitory computer-readable media. The method can include receiving attribute data comprising text associated with an item, the attribute data comprising (i) a set of unstructured attribute data for the item, and (ii) a set of structured attribute data for the item. The method can include analyzing the set of unstructured attribute data by processing through a first set of one or more Long Short Term Memory (LSTM) layers, to obtain an unstructured semantic signature indicative of a probability that the item belongs to one or more item categories based on the set of unstructured attribute data. The method can include analyzing the set of structured attribute data by processing through a first set of one or more Convolutional Neural Network (CNN) layers, to obtain a structured semantic signature that is indicative of the likelihood that the item belongs to one or more item categories based on the set of structured attribute data. The method can include analyzing the unstructured semantic signature and the structured semantic signature by processing through one or more layers selected from a second set of one or more CNN layers and a first set of bidirectional LSTM layers, to obtain an item semantic signature that is indicative of the likelihood that the item belongs to one or more item categories based on both the set of unstructured attribute data and the set of structured attribute data. The method can include classifying the item in one or more item categories in relation to the item semantic signature.

Figure 8:
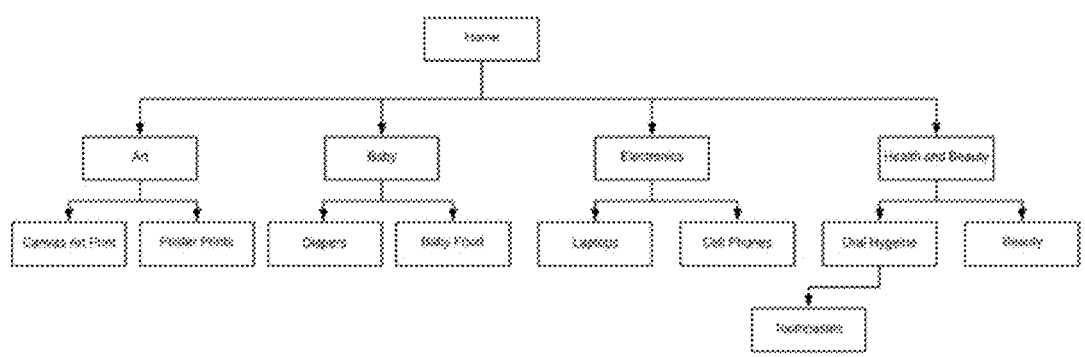
FIG. 8 illustrates a representative diagram of an embodiment of a taxonomy for retail products.

In various environments, including ecommerce and retail environments, items such as retail products are often organized according to a taxonomy where a hierarchy of product types exist. A goal of product type classification is to organize products into at least one of the product types. An example of an item/product taxonomy is shown in FIG. 8. For example, for products of the type "home", sub-types in a next level of the hierarchy can include "art", "baby", "electronics", and "health and beauty", with a next level for "art" including "canvas art prints" and "poster prints", a next level for "baby" including "diapers" and "baby food", a next level for "electronics" including "laptops" and "cell phones", and a next level for "health and beauty" including "oral hygiene" and "beauty". As shown, a further level for "oral hygiene" can be "toothpaste". Other levels in such a taxonomy also can exist for numerous different product types, such as for a selection of different products in a retail catalog and/or inventory.

For very large numbers of possible items and/or products, the item type classification can pose a very challenging extreme classification problem. For example, it can be the case in certain applications that items and/or products are intended for classification into up to 6000 different classes/product types. In one approach, classification can be performed based on one or more pieces of text associated with an item and/or product, such as by a machine learning and/or deep learning model capable of analyzing text. However, considering all attributes of an item and/or product as part of the modelling exercise can be a challenge when taking into account a very large number of unique product attributes, such as up to 10,000 attributes, which can arise with taxonomies used in ecommerce and in other areas.

Accordingly, in one embodiment, multiple Deep Learning methodologies can be combined to understand the semantic meaning of text associated with an item, to allow classification of the item into one or more product categories. In particular, embodiments herein can include using Deep Learning methodologies to understand the semantic meaning of pieces of unstructured data separately (e.g., Long Description, Title, Short Description etc.,) and then using the results to provide a semantic signature of the product that is indicative of the likelihood that a product belongs to one or more particular product types. Embodiments herein also can comprise separately analyzing structured data, such as attribute names (brand, color, dimension), and attribute values (Brand A, blue, thirty-two inch), so as to minimize the modelling challenge that can otherwise be posed by the order the attribute data appears in.

To further clarify, traditional statistical approaches do not seem to benefit from large amounts of labelled data, whereas Deep Learning based approaches generally improve with more training data. Accordingly, embodiments herein can exploit this feature, particularly where a significant amount of training data has been obtained over time. Furthermore, according to embodiments herein, Deep Learning can be used to take advantage of the sequential nature of unstructured data, which in traditional approaches may have been ignored. Accordingly, certain embodiments herein use Long Short Term Memory (LSTM) networks for embedding and/or understanding an entire segment of text, rather than relying on features like unigrams or the presence or absence of words.

According to certain embodiments, an advantage of Deep Learning models is that they can have some tolerance to random noise. For example, even in a case where the brand data for a retail product is wrong, the title and/or description of the product can contain correct descriptors relating to the product type. As Deep Learning methods can be capable of looking at the entirety of the product data and learning complex functions that are optimized for predicting product type, the model can be capable of ignoring or giving weightage to different aspects of the product data, according to experience and/or training of the model, to arrive at an appropriate category even in the presence of some misleading product data.

According to one embodiment, a high-level approach can comprise, for each unstructured attribute associated with an item (i) thresholding the attribute data based on a fixed length, (ii) embedding each word in the data using an Embedding Layer, (iii) passing the sequence of word embeddings to a Long Short Term (LSTM) layer, and (iv) getting the representation and/or semantic signature of the attribute. For each structured attribute associate with the item, the high-level approach can further comprise (i) getting the attribute names in any order and concatenating them as string separating them by an identifier, (ii) getting attribute values in any order and concatenating them as string separating them by an identifier, and (iii) passing the sequences of attribute names and values through Convolutional Neural Network (CNN)/convolution layers to get a semantic signature of the product. A primary advantage in using CNN layers for the structured data is that CNN's are invariant to position and/or order of the attributes. Once a representation of the item is obtained from both the structured and unstructured data, the representations can be joined and/or concatenated and passed through one or more subsequent layers using a Bidirectional LSTM and/or another CNN layer. Final processing with one or more subsequent layers also can be provided, and a prediction of a product type is provided based on the processing of the unstructured and structured attribute data through the layers.

Figure 9:
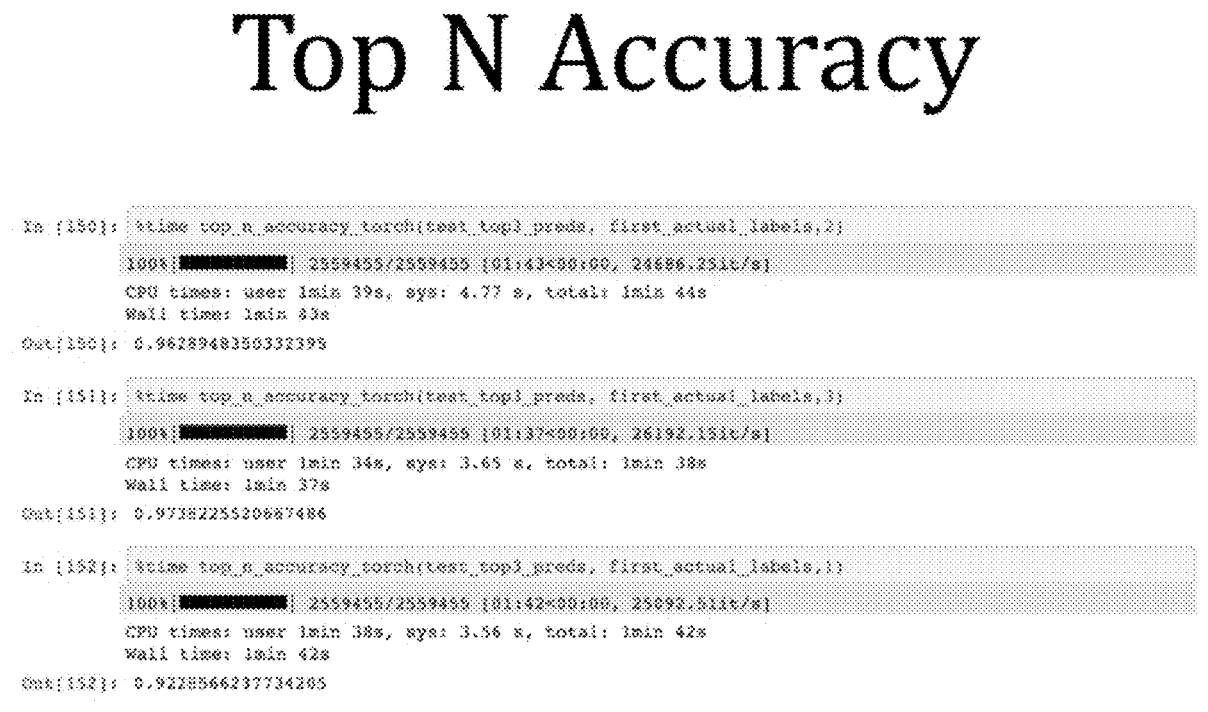
Figure 10A:
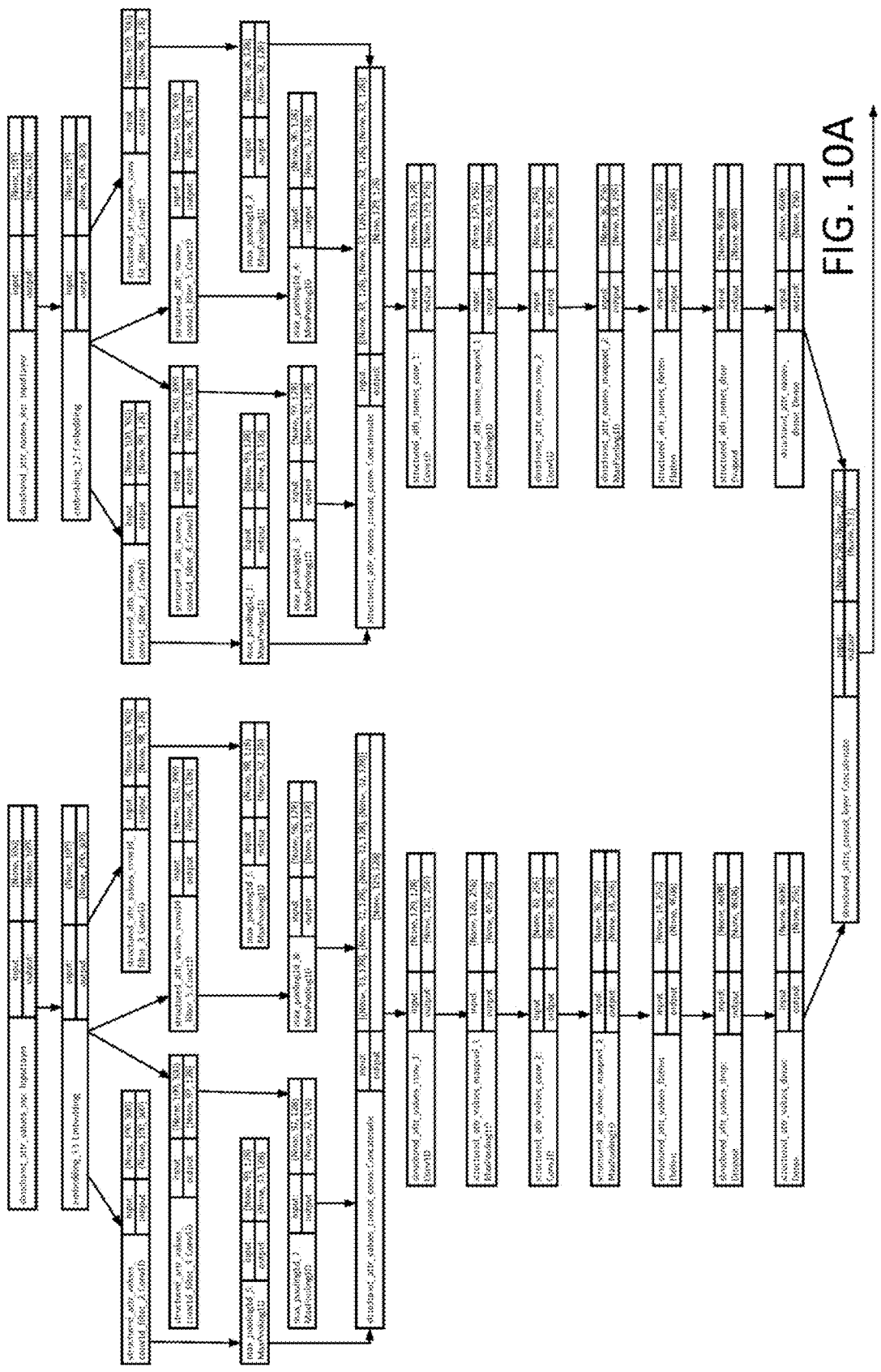
FIGS. 10A-10B illustrate a flow diagram for a portion of the method illustrated in FIG. 4, according to certain embodiments.
Figure 10B:
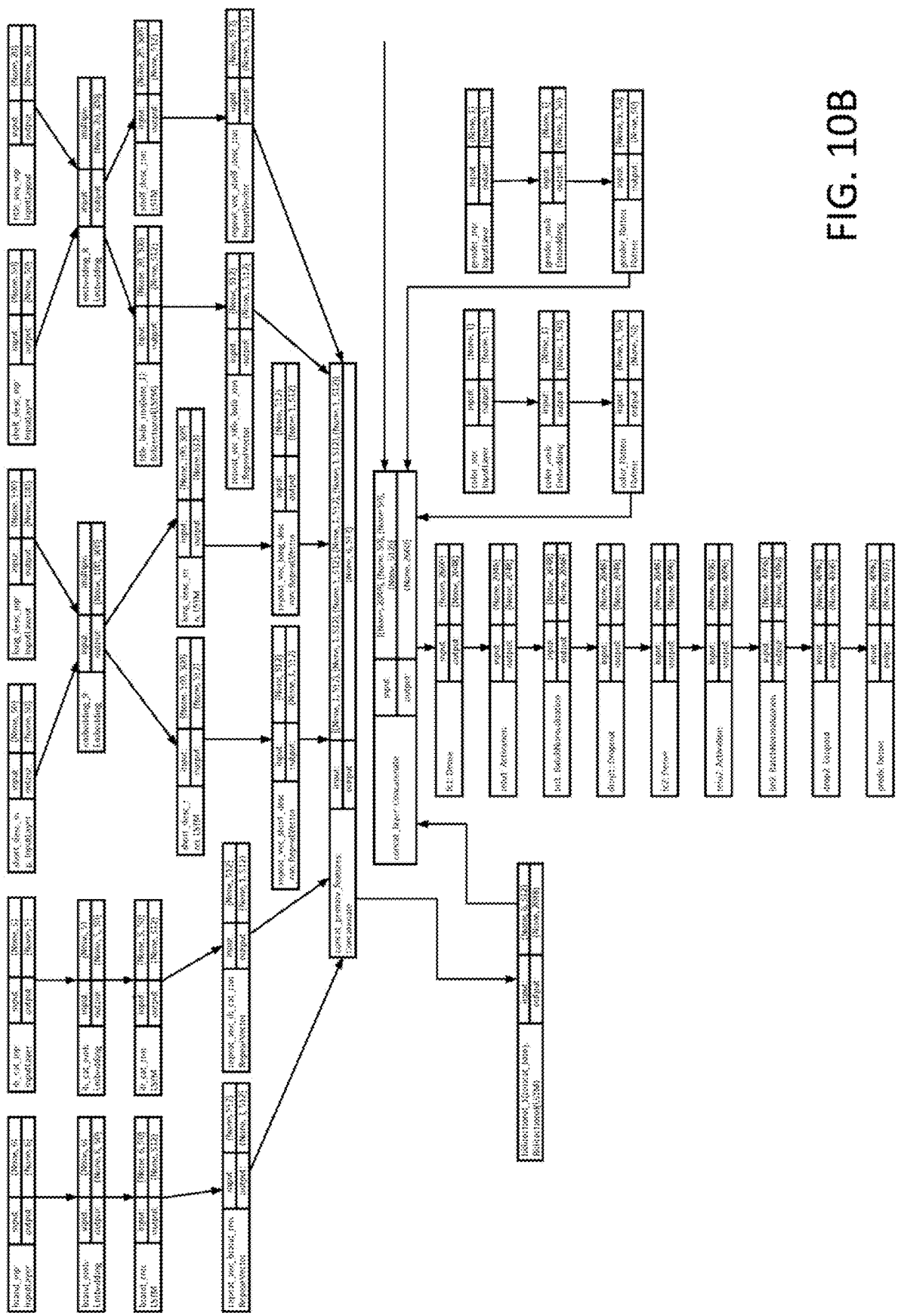

In one embodiment, aspects of the method and/or system herein can provide an improvement over previous classifiers of 22% in terms of F1 Score for an entire Catalog. Reviewing the top 1, top 2 and top 3 accuracies, it also can be seen that when mistakes in classification are made, they are often semantic mistakes that would seem reasonable to a user, such as placing an item that is an art print in "photo prints," as opposed to placing the item under "oral hygiene." Accordingly, embodiments can be capable of providing not only more accurate classification, but also increasing the acceptability to the user of any mistakes that are made. FIG. 9 illustrates a chart showing the top N accuracy according to an item classification method and/or system herein. FIGS. 10A-10B illustrate a flow diagram for a multi-LSTM based classification using structured attributes, such as for a portion of the method illustrated in FIG. 4 (e.g., activities 402 and 403). By way of clarification, the output arrow at the bottom of FIG. 10A is intended to connect to the open input arrow on the right hand side of FIG. 10B, to form a single flow chart that is spread between the two figures for purposes of illustration.

According to certain embodiments, the product signatures learned by the product type models also can be useful for solving many other downstream problems like product graph substitute recommendations, matching and/or mismatch detection, base variant detection and/or anomaly detection, and semantic search. According to certain embodiments, LSTM based approaches can provide advantages by being able to embed full sentences, instead of using a bag-of-word approach, having tolerance to random noise, having the ability of embed multiple unstructured pieces of text separately and concatenate them layer for classification, and allowing for pre-trained word embedding suing word2vec/glove. Articles that describe Convolutional Neural Networks (CNN) and Recurrent Neural Networks (RNN) (of which LSTM networks are a sub-type), include "Convolutional Neural Networks for Sentence Classification" to Yoon Kim, 2014 (arXiv:1408.5882v2 [cs.CL] 3 Sep. 2014) and "Large-Scale Item Categorization in e-Commerce Using Multiple Recurrent Neural Networks" to Jung-Woo Ha et al. (SIGKDD interdisciplinary conference, August 2016).

Figure 2:
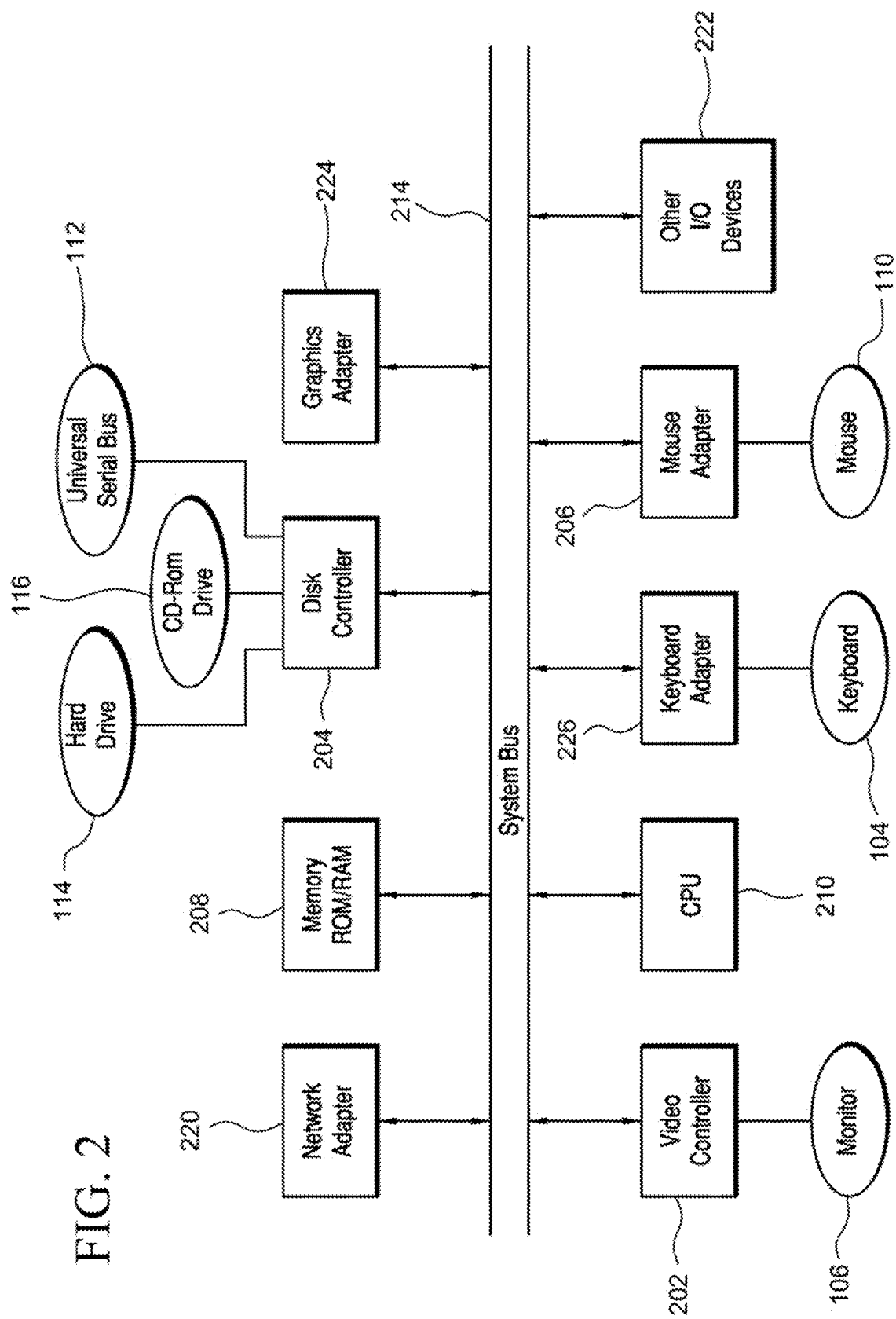
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile electronic device, such as a smartphone. In certain additional embodiments, computer system 100 can comprise an embedded system.

Figure 3:
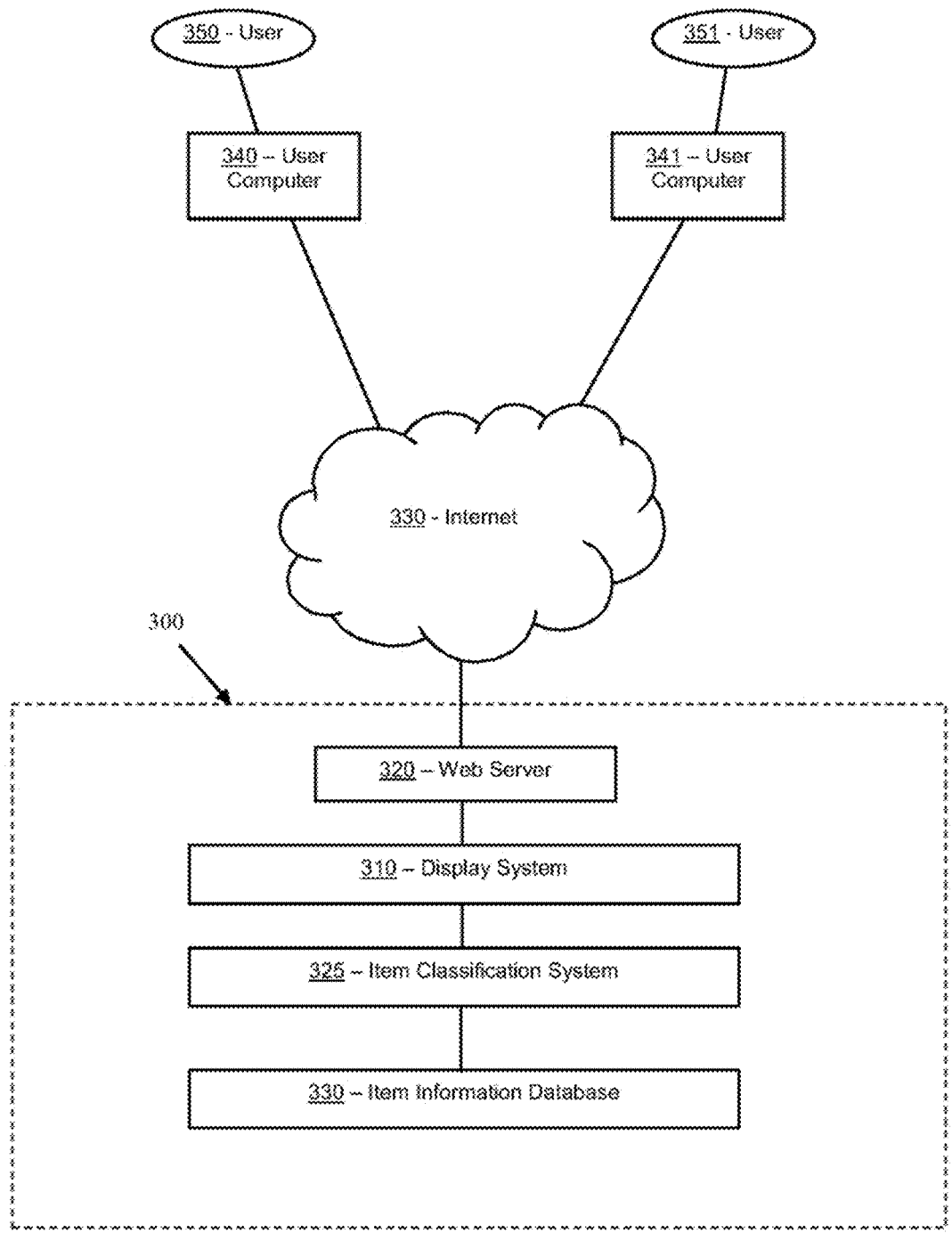
FIG. 3 illustrates a representative block diagram of a system, according to an embodiment.

Turning ahead in the drawings, FIG. 3 illustrates a block diagram of a system 300 that can be employed for classifying items according to item type and/or category, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a display system 310, a web server 320, and an item classification system 325. Display system 310, web server 320, and/or item classification system 325 can each be a computer system, such as computer system 100 (FIG. 1), as described above, and can each be a single computer, a single server, or a cluster or collection of computers or servers, or a cloud of computers or servers. In another embodiment, a single computer system can host each of two or more of display system 310, web server 320, and/or item classification system 325. Additional details regarding display system 310, web server 320, and/or item classification system 325 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, display system 310, web server 320, and/or item classification system 325 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the display system 310, web server 320, and/or item classification system 325 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the display system 310, web server 320, and/or item classification system 325. In a similar manner, the processing module(s) and the memory storage module(s) can be local and/or remote to each other.

In many embodiments, the display system 310, web server 320, and/or item classification system 325 can be configured to communicate with one or more user computers 340 and 341. In some embodiments, user computers 340 and 341 also can be referred to as customer computers. In some embodiments, display system 310, web server 320, and/or item classification system 325 can communicate or interface (e.g., interact) with one or more customer computers (such as user computers 340 and 341) through a network or internet 330. Internet 330 can be an intranet that is not open to the public. Accordingly, in many embodiments, display system 310, web server 320, and/or item classification system 325 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between display system 310, web server 320, and/or item classification system 325, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 7:
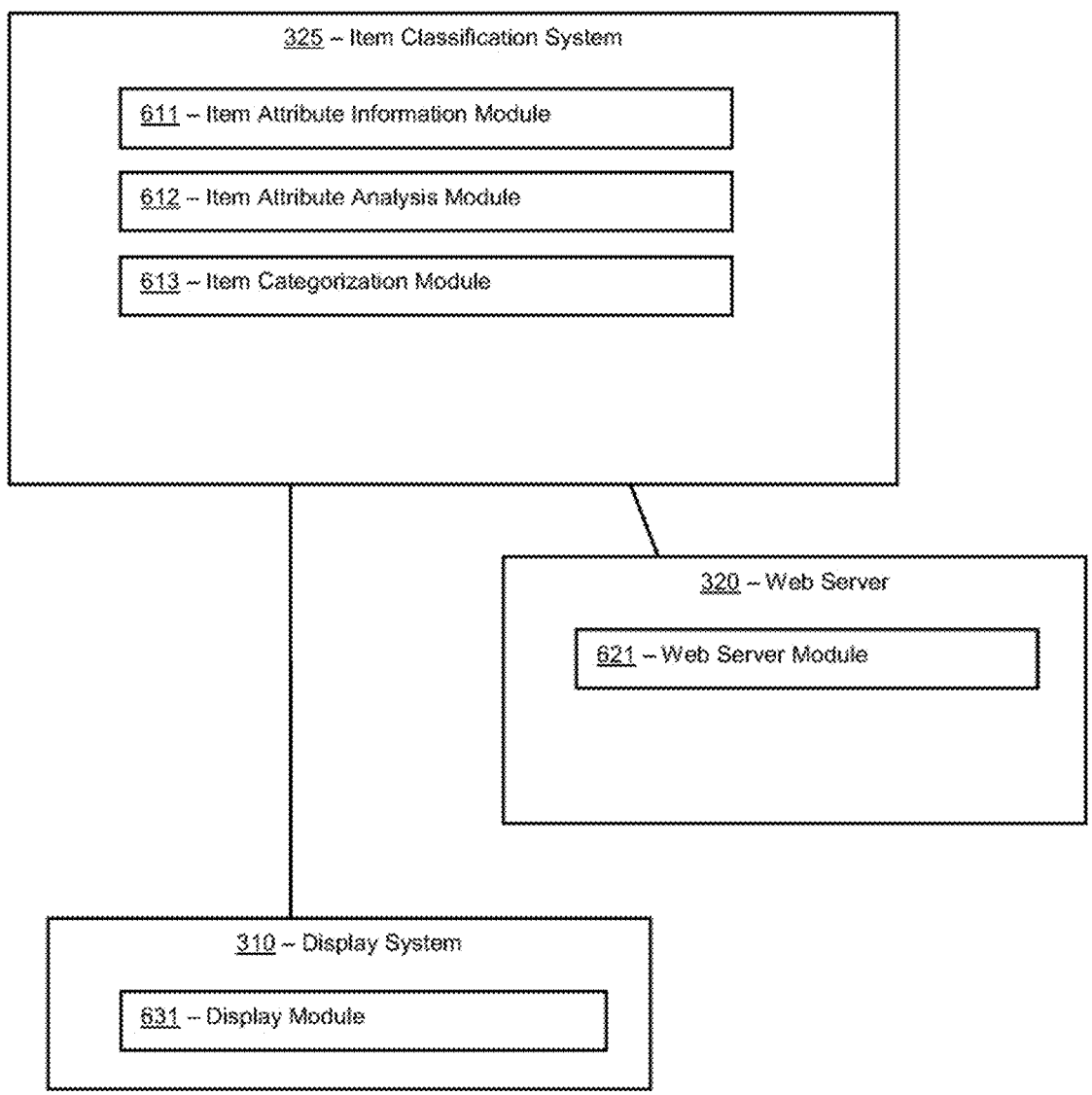
FIG. 7 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 611-613, 621 and/or 631 (FIG. 7). Such non-transitory memory storage modules can be part of a computer system such as item classification system 325 (FIGS. 3 & 7), web server 320 (FIGS. 3 & 7) and/or display system 310 (FIGS. 3 & 7). The processing module(s) can be similar or identical to the processing module(s) described above with respect to computer system 100 (FIG. 1).

In many embodiments, method 400 can comprise an activity 401 of receiving attribute data comprising text associated with an item, the attribute data comprising (i) a set of unstructured attribute data for the item, and (ii) a set of structured attribute data for the item. The attribute data can comprise, for example, text data that describes properties, features, use, or other identifying characteristics of the item. The attribute data can further comprise both unstructured and structured data for the item. The unstructured data can comprise, for example text-based descriptions of the item or characteristics of the item, such as the item title and/or name, a short description of the item, and/or a detailed or in-depth description of the item. Generally speaking, unstructured data is data that can have internal structure, but is not structured via pre-defined data models or schema. That is, the items of unstructured data can have a logic or structure within themselves, but may not necessarily have a predefined relationship to one another. At least some of the unstructured data can comprise data in descriptive text form, that lends itself analysis of context and/or or sequence of words in the text, such as by Long Short Term Memory (LSTM) networks or other models that can be capable of sequentially analyzing text. The structured data can comprise information that is structured via pre-defined schema such that items of structured data are organized with respect to and/or relate to one another. For example, structured data can contain indices that indicate a name of a type of data, with the values for that type of data being stored in association with the name of the type of data. Structured data can be, for example, stored in a relational database, spreadsheet, and/or other tabular forms that allow for the association of one or more values therein with certain indices and/or types of data. In one example, the structured data can comprise attribute names for the item, that can be paired or otherwise associated with one or more attribute values. For example, attribute names for an item can comprise one or more of item brand, item color, item dimensions, and attribute values for these attribute names, such as Brand A (brand), blue (color) and thirty-two inches (dimension). That is, the attribute data can be structured such that attribute values are stored in relationship with each of the attribute names. The structured and unstructured data for an item can be analyzed as described herein to provide information for classifying the item.

In one embodiment, the item classification system 325 (FIG. 3) can be in communication with one or more item information databases 330 (FIG. 3), where one or more of structured or unstructured attribute data of items can be stored The attribute data can be stored, for example, in an item information database (FIG. 3) that can be a part of the system 300 and/or can be remote from the system but accessible via communication such as the internet 330. For example, in one embodiment, the attribute data can be received from a computer system of a supplier of the item, and/or can be accessible by the system 300 in a database of an item supplier. The attribute data also can be input, for example by a user, and/or can be accessed from a plurality of databases and/or locations, such as a first database for structured data and a second database for unstructured data.

In certain embodiments, method 400 (FIG. 4) can continue by comprising an activity 402 (FIG. 4) of analyzing the set of unstructured attribute data, by processing through a first set of one or more Long Short Term Memory (LSTM) layers, to obtain an unstructured semantic signature indicative of a probability that the item belongs to one or more item categories based on the set of unstructured attribute data. That is, in one embodiment, one or more LSTM layers can be used to process one or more pieces of the unstructured attribute data belonging to the set, and thereby obtain an output that indicates the likelihood that the item belongs to one or more categories. In one embodiment, the set of unstructured attribute data that is processed through the one or more LSTM layers can comprise a plurality of attribute data for the item, such as for example title, short description, and long description, of the item. The first set of LSTM layers also can comprise a plurality of different LSTM layers, such as a unique LSTM layer for each unstructured attribute and/or unstructured attribute data type in the set. The first set of LSTM layers also can and/or alternatively comprise the same LSTM layers that are used to process select unstructured attributes. By processing the set of unstructured data attributes though the first set of LSTM layers, the unstructured semantic signature can be obtained that indicates, based on analysis of the unstructured data, what categories are the most likely candidates for the item to belong to.

In one embodiment, the activity 402 can comprise analyzing the set of unstructured attribute data by processing through the first set of one or more Long Short Term Memory (LSTM) layers, by thresholding the unstructured attribute data in the set based on a predetermined length, creating an embedded representation for the unstructured attribute data by processing the unstructured attribute data through an Embedding Layer, and processing the embedded representation to the first set of one or more LSTM layers. As understood by those of ordinary skill in the art, LSTM layers are a type of Recurrent Neural Networks (RNNs) that are capable of learning sequential and long-term dependencies, and so can be capable of obtaining semantic meaning from the sequence and/or context in a sentence or other text item. The LSTM layer can be a layer that analyzes the text data in a certain sequence (e.g., from left to right), and/or in certain embodiments can be a bidirectional LSTM layer that is capable of analyzing the text data from both directions.

Referring to FIG. 5, in one embodiment, the activity 402 comprises an activity 501 of dividing the set of unstructured attribute data into two or more subsets based on unstructured attribute data type, and continues with an activity 502 of processing at least two of the two or more subsets, separately from one another, through one or more LSTM layers in the first set of LSTM layers, to obtain at least two unstructured data subset semantic signatures. For example, for a set of unstructured attribute data comprising three types of unstructured attribute data, such as title, short description, and long description, the activity 501 can comprise dividing the set into two or more subsets, such as one subset each for the title, short description and long description. Alternatively, the activity 501 can comprise dividing the attribute data into subsets comprising a combination of the unstructured attribute data types, such as a subset comprising the title and short description, and a subset comprising the detailed description. The activity 502 comprises processing these subsets, separately from one another, through one or more LSTM layers. For example, in a case where the first subset comprises unstructured attribute data corresponding to a title for the item, the second subset comprises unstructured attribute data corresponding to the short description for the item, and the second subset comprises unstructured attribute data corresponding to a detailed description for the item, each of the subsets can be individually processed through one or more layers, such that an unstructured data subset semantic signature is obtained for each individual subset. Once the individual unstructured data subset semantic signatures are obtained, activity 402 can continue with activity 503 comprising processing at least two, and even all, of the unstructured data subset semantic signatures through one of more LSTM layers of the first set of LSTM layers, to obtain the unstructured semantic signature based on the set of unstructured attribute data. That is, activity 503 comprises obtaining an unstructured semantic signature representative of the unstructured attribute data, by processing the individual unstructured subset semantic signatures obtained for the two or more subsets through one or more LSTM layers.

Returning to FIG. 4, in certain embodiments, method 400 continues by comprising an activity 403 that comprises analyzing the set of the structured text attributes by processing through a first set of one or more Convolutional Neural Network (CNN) layers, to obtain a structured semantic signature that is indicative of the likelihood that the item belongs to one or more item categories based on the set of structured attribute data. That is, in one embodiment, one or more CNN layers can be used to process one or more pieces of the structured attribute data belonging to the set, and thereby obtain an output that indicates the likelihood that the item belongs to one or more categories. In one embodiment, the set of structured attribute data that is processed through the one or more CNN layers can comprise both one or more structured attribute data names and one or more structured attribute values, such as for example structured attribute data names including brand, color, and dimension, with corresponding structured attribute data values comprising Brand A (brand), blue (color) and thirty-two inches (dimension). The first set of CNN layers also can comprise a plurality of different CNN layers, such as a unique CNN layer for each piece of structured attribute data and/or structured attribute data type in the set. The first set of CNN layers also can and/or alternatively comprise the same CNN layers that are used to process select structured attributes. By processing the set of structured data attributes though the first set of CNN layers, the structured semantic signature can be obtained that indicates, based on analysis of the structured data, what categories are the most likely candidates for the item to belong to.

In one embodiment, the activity 403 can comprise analyzing the set of structured attribute data by processing through the first set of one or more Convolutional Neural Network (CNN) layers, by processing through one or more CNN layers of the first set that are capable of any one or more of (i) analyzing the set of structured attribute data based on individual words in the structured attribute data text, (ii) analyzing the set of structured attribute data based on combinations more words in the structured attribute data text, and (ii) analyzing the set of structured attribute data to identify one or more words in the structured attribute data text indicative of different item types. That is, the first set of one or more CNN layers can include layers that can identify single words, two words, or three words in the structured attribute data, such as unigrams, bigrams, and trigrams, among others. The first set of CNN layers also can include one or more CNN layers that identify one or more words specific to a certain category, such as for example CNN layers capable of identifying words indicative of an electronics category, or oral hygiene category. Accordingly, by processing the structured attribute data through a plurality of different CNN layers in the first set, each of which can be capable of targeting different aspects and/or features of the structured attribute data, the structured semantic signature can be obtained that is indicative of the likelihood of the item belonging to a category based on the structured attribute data.

Referring to FIG. 6, in one embodiment, the activity 403 comprises an activity 601 of generating a structured attribute data name string by concatenating the one or more structured attribute data names, and an activity 602 of generating a structured attribute data value string by concatenating the one or more structured attribute data values. That is, at least two concatenated strings can be generated, the first containing a concatenation of the structured attribute data names (e.g., brand; color; dimension), and the second containing a concatenation of the respective structured attribute data values (e.g., Brand A; blue; thirty-two inches). As understood by those of ordinary skill in the art, CNN layers can be capable of providing analysis that is independent of the sequential nature of data, and so the concatenation of the structured attribute data types (name and values) can be used as appropriate input for the first set of CNN layers. Furthermore, as shown in FIG. 6, the activity 403 can comprise an activity 603 of processing the structured attribute data name string through one or more CNN layers of the first set of CNN layers, and an activity 604 of processing the structured attribute data value string through one or more CNN layers of the first set of CNN layers, based on a result obtained from processing the structured attribute data name string through one or more CNN layers of the first set of CNN layers. That is, according to certain embodiments, the structured attribute data name string can be processed through one or more CNN layers of the first layer before processing of the structured attribute data value string, to provide information that is useful in the processing of the structured attribute data value string.

For example, in one embodiment, a semantic signature for the structured attribute data name string can be obtained by processing through one or more CNN layers in the first set, and can be used as input for processing the structured attribute data value string through one or more CNN layers in the first set. In one embodiment, an order of processing involving processing the structured attribute name string before the structured attribute value string, and/or use of information from processing of the structured attribute data name string in processing of the structured attribute value string, can be provided because the structure attribute data names can provide increased guidance for classification over the structured attribute data values. That is, while the structured attribute data values can have a variety of different possible values that do not provide as much information about a possible category, the structured attribute data names can be more indicative of a possible category for the item. Accordingly, by processing the structured attribute data names, information can be obtained that can help to guide processing of the structured attribute data values, to obtain the structured attribute data semantic signature.

Returning to FIG. 4, in one embodiment, the method 400 continues by comprising an activity 404 of analyzing the unstructured semantic signature and structured semantic signatures by processing through one or more layers selected from a second set of CNN layers and a first set of bidirectional LSTM layers, to obtain an item semantic signature that is indicative of the likelihood that the item belongs to one or more item categories based on both the unstructured and structured attribute data sets. That is, the unstructured semantic signature obtained by processing of the unstructured attribute data in activity 402, and the structured semantic signature obtained by processing of the structured attribute data in activity 403, are processing through one or more CNN layers and/or bidirectional LSTM layers, to get an overall item semantic signature based on both the structured and unstructured attribute data. In one embodiment, the second set of CNN layers is different than the first set of CNN layers, and/or alternatively the second set of CNN layers can overlap with and/or can be the same as the first set of CNN layers. Similarly, the first set of bidirectional LSTM layers can further optionally comprise one or more LSTM layers (unidirectional layers), such as LSTM layers that are the same as those provided in the first set of LSTM layers. The item semantic signature obtained by processing the structured and unstructured attribute data semantic signature is indicative of the one or more likely categories that the item belongs to.

According to one embodiment, the method 400 continues by comprising an activity 405 of classifying the item in one or more item categories in relation to the item semantic signature. That is, the output of activity 404, and namely the item semantic signature, can be used to determine what categories of items the item belongs to. In one embodiment, the item semantic signature is related to a probability that an item belongs to one or more categories, such that the item can be classified by assigning the item to one or more categories that have the highest probabilities of being the category the item belongs to. According to yet another embodiment, the item can be classified into a single item category that has the highest probability of being the category the item belongs to. In yet another embodiment, the item can be classified to every category that has a probability that is above a certain predetermined amount for being the category the item belongs to. The information regarding classification of the item, and the one or more categories it is classified in, can be saved in a database in the system 300, such as the item information database 330, and/or can be saved at a remote location. By classifying the item into the one or more categories, the system 300 can be able in certain embodiments to provide a user with information about the item when the user makes inquiries and/or searches for any category of items to which the item has be classified.

Furthermore, according to one embodiment, the system 300 (FIG. 3) can be capable of providing information for display of the item, such as in relation to any one or more of (i) selection by a user 350, 351 (FIG. 3) of the one or more categories the item is classified in, and (ii) search by a user 350, 351 (FIG. 3) for the one or more categories the item is classified in. For example, referring to FIG. 4, in a case where one or more user computers 340, 341 (FIG. 3) accesses the system 300 (FIG. 3) by webserver 320 (FIG. 3), the item classification system 325 can operate with the display system 310 (FIG. 3) to provide a display of the item to the user 350, 351 (FIG. 3), such as a display of the item on a display screen of the user computer 340, 341 (FIG. 3). The display system 310 (FIG. 3) can provide information for display of the item when the user 350, 351 (FIG. 3) has, for example, requested information from the system 300 (FIG. 3) about one or more categories the item is classified, such as via selection by a user 350, 351 (FIG. 3) of a category on a retail website hosted by the web server 320 (FIG. 3). The display system 310 (FIG. 3) also can provide information for display of the item when the user 350, 351 (FIG. 3) has, for example, input the one or more categories into a search request on a retail website hosted by the web server. Accordingly, the classification of the item into one or more item categories can allow for the item to appear in the appropriate categories when a user 350, 351 (FIG. 3) attempts to view and/or search the categories for items.

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

FIG. 7 illustrates a block diagram of a portion of system 300 comprising item classification system 325, web server 320 and/or display system 310, according to the embodiment shown in FIG. 3. Each of item classification system 325, web server 320 and/or display system 310 is merely exemplary and not limited to the embodiments presented herein. Each of item classification system 325, web server 320 and/or display system 310 can be employed in many different embodiments or examples not specifically depicted or described herein. In some embodiments, certain elements or modules of item classification system 325, web server 320 and/or display system 310 can perform various procedures, processes, and/or acts. In other embodiments, the procedures, processes, and/or acts can be performed by other suitable elements or modules.

In many embodiments, item classification system 325 can comprise non-transitory memory storage module 611. Memory storage module 611 can be referred to as item attribute information module 611. In many embodiments, item attribute information module 611 can store computing instructions configured to run on one or more processing modules and perform one or more acts of method 400 (FIG. 4) (e.g., activity 401 of receiving attribute data comprising text associated with an item (FIG. 4)).

In certain embodiments, item classification system 325 (FIGS. 3 and 7) can further comprise memory storage module 612 (FIG. 7). Memory storage module 612 can be referred to as item attribute analysis module 612. In many embodiments, item attribute analysis module 611 can store computing instructions configured to run on one or more processing modules and perform one or more acts of method 400 (FIG. 4) (e.g., activity 402 of analyzing the set of unstructured attribute data by processing through a first set of one or more Long Short Term Memory (LSTM) layers, to obtain an unstructured semantic signature (FIG. 4); activity 403 of analyzing the set of the structured text attributes by processing through a first set of one or more Convolutional Neural Network (CNN) layers, to obtain a structured semantic signature (FIG. 4); and activity 404 of analyzing the unstructured semantic signature and structured semantic signatures by processing through one or more layers selected from a second set of CNN layers and a first set of bidirectional LSTM layers, to obtain an item semantic signature that is indicative of the likelihood that the item belongs to one or more item categories (FIG. 4)).

Furthermore, in many embodiments, item attribute analysis module 611 can store computing instructions configured to run on one or more processing modules and perform one or more acts of method 400, activity 402 (FIG. 5) (e.g., activity 501 of dividing the set of unstructured attribute data into two or more subsets based on unstructured attribute data type (FIG. 5); activity 502 of processing at least two of the two or more subsets, separately from each other, through one or more LSTM layers in the first set of LSTM layers, to obtain at least two unstructured data subset semantic signatures (FIG. 5); and activity 503 of processing the at least two unstructured data subset semantic signatures through one or more LSTM layers of the first set of LSTM layers, to obtain the unstructured semantic signature (FIG. 5)). Also, in many embodiments, item attribute analysis module 611 can store computing instructions configured to run on one or more processing modules and perform one or more acts of method 400, activity 403 (FIG. 6) (e.g., activity 601 of generating a structured attribute data name string by concatenating the one or more structured attribute data names (FIG. 6); activity 602 of Generating a structured attribute data value string by concatenating the one or more structured attribute data values (FIG. 6); activity 603 of processing the structured attribute data name string through one or more CNN layers of the first set of CNN layers (FIG. 6); and activity 604 of processing the structured attribute data value string through one or more CNN layers of the first set of CNN layers, based on a result obtained from processing the structured attribute data name string through one or more CNN layers of the first set of CNN layers (FIG. 6)).

In certain embodiments, item classification system 325 (FIGS. 3 and 7) can further comprise memory storage module 613 (FIG. 7). Memory storage module 613 can be referred to as item categorization module 613. In many embodiments, item categorization module 613 can store computing instructions configured to run on one or more processing modules and perform one or more acts of method 400 (FIG. 4) (e.g., activity 405 of classifying the item in one or more item categories in relation to the item semantic signature (FIG. 4)).

In many embodiments, display system 310 (FIG. 7) can comprise non-transitory memory storage module 631. Memory storage module 631 can be referred to as display module 631. In many embodiments, display module 631 can store computing instructions configured to run on one or more processing modules and perform one or more acts of method 400 (FIG. 4). In one embodiment, the display module 631 can store computing instructions configured to run on one or more processing modules to provide instructions for display of an item according to a request or search by a user for a category to which the item has been classified.

In many embodiments, web server 320 (FIG. 7) can comprise non-transitory memory storage module 621. Memory storage module 621 can be referred to as web server module 621. In many embodiments, web server module 621 can store computing instructions configured to run on one or more processing modules and perform one or more acts of method 400 (FIG. 4) (e.g., activity 401 of receiving attribute date comprising text associated with an item (FIG. 4)). The web server module 621 (FIG. 7) in certain embodiments can store computing instructions configured to run on one or more processing modules and provide a webpage to one or more user computers 340, 341 (FIG. 3) for viewing and/or interaction by the user 350, 351 (FIG. 3). The web server module 621 (FIG. 7) in certain embodiments also can store computing instructions configured to run on one or more processing modules and to receive an inquiry and/or search from a user computer 340, 341 (FIG. 3) regarding a category, including a request for a display of items that are classified in one or more categories. For example, the web server module 621 (FIG. 7) can provide a web page with a menu for selection of different item categories to a user, and can coordinate with the display module 631 (FIG. 7) to provide a display of items classified in a category selected from the menu. As another example, the web server module 621 (FIG. 7) can provide a web page with a search function to a user, for searching of different item categories by a user, and many coordinate with display module 631 (FIG. 7) to provide a display of items classified in a category that is searched for by the user.

In many embodiments, the techniques described herein can provide a practical application and several technological improvements. In some embodiments, the techniques described herein can provide for automatic classification of items such that they can be searched for and viewed by a user in an appropriate category. In some embodiments, the techniques described herein provide advances in deep learning and/or machine learning to tackle classification of times using not only structured data associated with the item, but also unstructured data. In many embodiments, the machine learning/deep learning networks described herein, including networks having one or more of CNN, LSTM and/or bidirectional LSTM layers, can be pre-trained, but in some embodiments they also can consider both historical and dynamic input regarding item categorization.

In many embodiments, the techniques described herein can beneficially use current geo-location information for the users as a part of the input for analysis of item classification, and/or to determine categories that can be of interest for displaying to a user. Furthermore, in a number of embodiments, the techniques described herein can advantageously provide a consistent user experience by substantially accurately identifying one or more categories that an item can belong to, so the user can reliably view and/or search categories for appropriate items.

In many embodiments, the techniques described herein can be used continuously at a scale that cannot be handled using manual techniques. For example, the number of CNN and/or LSTM layers used to process the attribute data for an item can exceed a few thousand.

In a number of embodiments, the techniques described herein can solve a technical problem that arises only within the realm of computer networks, as the ability to use large data sets and deep learning/machine learning neural networks including Convolutional Neural Networks (CNNs) and Long Short Term Memory networks (LSTMS), to model suitable outcomes based on the large data sets, do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the machine learning model cannot be performed without a computer.

Although systems and methods for item classification have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10B can be modified, and that the foregoing discussion of certain of these embodiments does not necessarily represent a complete description of all possible embodiments. For example, one or more of the procedures, processes, or activities of FIGS. 4-6 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to and perform functions comprising:
receiving attribute data comprising text associated with an item to classify the item into one or more item categories, wherein the attribute data comprises:
(i) a set of unstructured attribute data for the item, wherein the set of unstructured attribute data comprises one or more sentences; and
(ii) a set of structured attribute data for the item;
analyzing the set of unstructured attribute data by processing through a first set of one or more Long Short Term Memory (LSTM) layers of a first deep learning model to output obtain an unstructured semantic signature of an attribute for the item by at least embedding each word in the set of unstructured attribute data and passing a sequence of each word embedding to the LSTM layers, wherein the unstructured semantic signature of the attribute for the item is indicative of a probability that the item belongs to one or more first item categories based on the set of unstructured attribute data;
analyzing the set of structured attribute data by processing through a first set of one or more Convolutional Neural Network (CNN) layers of a second deep learning model, to output a structured semantic signature of the item by receiving one or more attribute names in a random order and concatenating each one of the one or more attribute names as a respective string separated by a respective identifier, wherein the structured semantic signature of the item that is indicative of a likelihood that the item belongs to one or more second item categories based on the set of structured attribute data;
generating a concatenated semantic signature of the attribute data by processing the unstructured semantic signature of the attribute for the item and the structured semantic signature of the item through one or more layers selected from a second set of one or more CNN layers;
processing the concatenated semantic signature through a first set of bidirectional LSTM layers to obtain an item semantic signature that is indicative of the likelihood that the item belongs to the one or more item categories based on both the set of unstructured attribute data and the set of structured attribute data; and
classifying the item in the one or more item categories in relation to the item semantic signature.

2. The system of claim 1, wherein analyzing the set of unstructured attribute data by processing through the first set of one or more LSTM layers of the first deep learning model further comprises:
thresholding unstructured attribute data in the set of unstructured attribute data based on a predetermined length;
creating an embedded representation for the unstructured attribute data by processing the unstructured attribute data through an embedding layer, wherein the embedding layer (i) embeds the one or more sentences as the embedded representation for the unstructured attributed data, and (ii) embeds multiple unstructured pieces of text separately to provide tolerance to random noise, wherein at least one of embedding the one or more sentences or embedding the multiple unstructured pieces of text comprise embedding each word; and
processing the embedded representation to the first set of one or more LSTM layers, wherein processing the embedded representation comprises passing the sequence of each word embedding.

3. The system of claim 1, wherein:
the set of unstructured attribute data for the item further comprises two or more types of unstructured attribute data; and
analyzing the set of unstructured attribute data by processing through the first set of one or more LSTM layers comprises:
dividing the set of unstructured attribute data into two or more subsets based on an unstructured attribute data type; and
processing at least two of the two or more subsets, separately from each other, through one or more LSTM layers in the first set of one or more LSTM layers, to obtain at least two unstructured data subset semantic signatures.

4. The system of claim 3, wherein analyzing the set of unstructured attribute data by processing through the first set of one or more LSTM layers of the first deep learning model further comprises:
processing the at least two unstructured data subset semantic signatures through one or more LSTM layers of the first set of one or more LSTM layers to output obtain the unstructured semantic signature of the attribute for the item based on the set of unstructured attribute data.

5. The system of claim 3, wherein the two or more types of unstructured attribute data comprise one or more of a title, a summary, or a detailed description of the item.

6. The system of claim 1, wherein:
the set of structured attribute data comprises one or more structured attribute data names and one or more structured attribute data values; and
analyzing the set of structured attribute data by processing through the first set of one or more CNN layers of the second deep learning model further comprises:
generating a structured attribute data name string by concatenating the one or more structured attribute data names;
generating a structured attribute data value string by concatenating the one or more structured attribute data values;
processing the structured attribute data name string through one or more CNN layers of the first set of one or more CNN layers; and
processing the structured attribute data value string through one or more CNN layers of the first set of one or more CNN layers.

7. The system of claim 6, wherein processing the structured attribute data value string through one or more CNN layers of the first set of one or more CNN layers is based on a result obtained from processing the structured attribute data name string through one or more CNN layers of the first set of one or more CNN layers.

8. The system of claim 6, wherein one or more of the one or more structured attribute data names for the item is indicative of an item brand.

9. The system of claim 1, wherein analyzing the set of structured attribute data by processing through the first set of one or more CNN layers of the second deep learning model further comprises:

processing through one or more CNN layers of the first set of one or more CNN layers that are capable of any one or more of:
(i) analyzing the set of structured attribute data based on individual words in the set of structured attribute data;
(ii) analyzing the set of structured attribute data based on combinations of one or more words in the set of structured attribute data, or
(iii) analyzing the set of structured attribute data to identify the one or more words in the set of structured attribute data, wherein the one or more words are indicative of different item types.

10. The system of claim 1, wherein the computing instructions, when executed on the one or more processors, further cause the one or more processors to perform a function comprising:
providing information for display of the item in relation to any one or more of (i) a selection by a user of the one or more item categories the item is classified in, and (ii) a search by a user for the one or more item categories the item is classified in.

11. A method being implemented via execution of computing instructions configured to run at one or more processors and configured to be stored at non-transitory computer-readable media, the method comprising:
receiving attribute data comprising text associated with an item to classify the item into one or more item categories, wherein the attribute data comprises:
(i) a set of unstructured attribute data for the item, wherein the set of unstructured attribute data comprises one or more sentences; and
(ii) a set of structured attribute data for the item;
analyzing the set of unstructured attribute data by processing through a first set of one or more Long Short Term Memory (LSTM) layers of a first deep learning model to output an unstructured semantic signature of an attribute for the item by at least embedding each word in the set of unstructured attribute data and passing a sequence of each word embedding to the LSTM layers, wherein the unstructured semantic signature of the attribute for the item is indicative of a probability that the item belongs to one or more first item categories based on the set of unstructured attribute data;
analyzing the set of structured attribute data by processing through a first set of one or more Convolutional Neural Network (CNN) layers of a second deep learning model, to output obtain a structured semantic signature of the item by receiving one or more attribute names in a random order and concatenating each one of the one or more attribute names as a respective string separated by a respective identifier, wherein the structured semantic signature of the item is indicative of a likelihood that the item belongs to one or more second item categories based on the set of structured attribute data;
generating a concatenated semantic signature of the attribute data by processing the unstructured semantic signature of the attribute for the item and the structured semantic signature of the item through one or more layers selected from a second set of one or more CNN layers;
processing the concatenated semantic signature through a first set of bidirectional LSTM layers to obtain an item semantic signature that is indicative of the likelihood that the item belongs to the one or more item categories based on both the set of unstructured attribute data and the set of structured attribute data; and
classifying the item in the one or more item categories in relation to the item semantic signature.

12. The method of claim 11, wherein analyzing the set of unstructured attribute data by processing through the first set of one or more LSTM layers of the first deep learning model, further comprises:
thresholding unstructured attribute data in the set of unstructured attribute data based on a predetermined length;
creating an embedded representation for the unstructured attribute data by processing the unstructured attribute data through an embedding layer, wherein the embedding layer (i) embeds the one or more sentences as the embedded representation for the unstructured attributed data, and (ii) embeds multiple unstructured pieces of text separately to provide tolerance to random noise, wherein at least one of embedding the one or more sentences or embedding the multiple unstructured pieces of text comprise embedding each word; and
processing the embedded representation to the first set of one or more LSTM layers, wherein processing the embedded representation comprises passing the sequence of each word embedding.

13. The method of claim 11, wherein:
the set of unstructured attribute data for the item further comprises two or more types of unstructured attribute data; and
analyzing the set of unstructured attribute data by processing through the first set of one or more LSTM layers comprises:
dividing the set of unstructured attribute data into two or more subsets based on an unstructured attribute data type; and
processing at least two of the two or more subsets, separately from each other, through one or more LSTM layers in the first set of one or more LSTM layers, to obtain at least two unstructured data subset semantic signatures.

14. The method of claim 13, wherein analyzing the set of unstructured attribute data by processing through the first set of one or more LSTM layers of the first deep learning model further comprises:
processing the at least two unstructured data subset semantic signatures through one or more LSTM layers of the first set of one or more LSTM layers to output the unstructured semantic signature of the attribute for the item based on the set of unstructured attribute data.

15. The method of claim 13, wherein the two or more types of unstructured attribute data comprise one or more of a title, a summary, or a detailed description of the item.

16. The method of claim 11, wherein the set of structured attribute data comprises one or more structured attribute data names and one or more structured attribute data values; and
analyzing the set of structured attribute data by processing through the first set of one or more CNN layers of the second deep learning model further comprises:
generating a structured attribute data name string by concatenating the one or more structured attribute data names;
generating a structured attribute data value string by concatenating the one or more structured attribute data values;
processing the structured attribute data name string through one or more CNN layers of the first set of one or more CNN layers; and processing the structured attribute data value string through one or more CNN layers of the first set of one or more CNN layers.

17. The method of claim 16, wherein processing the structured attribute data value string through one or more CNN layers of the first set of one or more CNN layers is based on a result obtained from processing the structured attribute data name string through one or more CNN layers of the first set of one or more CNN layers.

18. The method of claim 16, wherein one or more of the one or more structured attribute data names for the item is indicative of an item brand.

19. The method of claim 11, wherein analyzing the set of structured attribute data by processing through the first set of one or more CNN layers of the second deep learning model further comprises:
processing through one or more CNN layers of the first set of one or more CNN layers that are capable of any one or more of:

(i) analyzing the set of structured attribute data based on individual words in the set of structured attribute data;

(ii) analyzing the set of structured attribute data based on combinations of one or more words in the set of structured attribute data, or (iii) analyzing the set of structured attribute data to identify the one or more words in the set of structured attribute data, wherein the one or more words are indicative of different item types.

20. The method of claim 11, further comprising:

providing information for display of the item in relation to any one or more of (i) a selection by a user of the one or more item categories the item is classified in, and (ii) a search by a user for the one or more item categories the item is classified in.

* * * * *